US012093866B2

(12) United States Patent
Kreis et al.

(10) Patent No.: US 12,093,866 B2
(45) Date of Patent: Sep. 17, 2024

(54) SYSTEMS AND METHODS FOR OPTIMIZING ASSEMBLY OF PRODUCT KITS IN AN ORDER FULFILLMENT CENTER USING AUTONOMOUS VEHICLES

(71) Applicant: Ocado Innovation Limited, Hatfield (GB)

(72) Inventors: Jeff Kreis, Wolleboro, NH (US); Alexa Mellon, Cambridge, MA (US)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 17/378,439

(22) Filed: Jul. 16, 2021

(65) Prior Publication Data
US 2022/0405669 A1    Dec. 22, 2022

Related U.S. Application Data

(60) Provisional application No. 63/211,497, filed on Jun. 16, 2021.

(51) Int. Cl.
*G06Q 10/0631*    (2023.01)
*G05D 1/00*    (2006.01)
(Continued)

(52) U.S. Cl.
CPC ....... *G06Q 10/06315* (2013.01); *G05D 1/021* (2013.01); *G05D 1/0212* (2013.01);
(Continued)

(58) Field of Classification Search
CPC ...... B65G 1/1373; B65G 61/00; B65G 47/90; G06Q 10/087; G06Q 10/0875;
(Continued)

(56) References Cited

U.S. PATENT DOCUMENTS 4,894,908 A * 1/1990 Haba, Jr. ............... B23P 21/004
29/784
5,412,576 A * 5/1995 Hansen ............. G06Q 10/0875
706/919

(Continued)

FOREIGN PATENT DOCUMENTS

WO    2019217420    11/2019
WO    2020257389    12/2020

OTHER PUBLICATIONS

Comand, Nicloa et al., Optimization of a Kitting Line: A Case Study Robotics, Aug. 7, 2019 (Year: 2019).*

(Continued)

*Primary Examiner* — Scott L Jarrett
(74) *Attorney, Agent, or Firm* — Hanley, Flight & Zimmerman, LLC

(57) ABSTRACT

Systems and methods for managing kit orders in a fulfillment center are described herein. The example systems can be configured to receive a determination that a kit pick job is needed to pre-assemble a kit, wherein the kit comprises a first item and a second item. The determination can be based on a number of orders for the kit, a kit pre-assembly time, and a kit on-demand assembly time. The determination also can be based on historical order data for the kit and a predicted number of orders for the kit. The kit pick job is created, wherein the kit pick job is associated with at least one of a plurality of the first item and a plurality of the second item, and the kit pick job is transmitted to an autonomous vehicle for completion.

20 Claims, 6 Drawing Sheets

(51) Int. Cl.
*G06Q 10/087* (2023.01)
*G06Q 30/0202* (2023.01)
*G06Q 30/0601* (2023.01)
*G06N 20/00* (2019.01)

(52) U.S. Cl.
CPC ..... *G06Q 10/06313* (2013.01); *G06Q 10/087* (2013.01); *G06N 20/00* (2019.01); *G06Q 30/0202* (2013.01); *G06Q 30/0635* (2013.01)

(58) Field of Classification Search
CPC ..... G06Q 10/063114; G06Q 10/06315; G06Q 10/08; G06Q 50/28
See application file for complete search history.

(56) References Cited

U.S. PATENT DOCUMENTS

| | | | | |
|---|---|---|---|---|
| 5,953,707 | A * | 9/1999 | Huang | G06Q 10/06315 705/7.31 |
| 6,119,102 | A * | 9/2000 | Rush | G06Q 10/0875 705/29 |
| 6,151,582 | A * | 11/2000 | Huang | G06Q 10/06315 705/7.31 |
| 6,847,858 | B2 * | 1/2005 | Arnold | G06Q 10/06 700/216 |
| 7,532,947 | B2 * | 5/2009 | Waddington | G06Q 10/087 700/216 |
| 7,747,340 | B2 * | 6/2010 | Jones | G06Q 10/087 705/28 |
| 8,024,237 | B1 * | 9/2011 | Davidson | G06Q 10/06 705/29 |
| 8,229,791 | B2 * | 7/2012 | Bradley | G06G 1/14 705/28 |
| 8,402,426 | B2 * | 3/2013 | Alfandary | G06Q 10/087 717/102 |
| 8,600,841 | B2 * | 12/2013 | Cheng | G06Q 10/087 705/28 |
| 8,892,241 | B2 * | 11/2014 | Weiss | B65G 1/1378 700/229 |
| 9,834,380 | B2 | 12/2017 | Hamilton et al. | |
| 10,053,289 | B2 * | 8/2018 | Hamilton | G05B 19/41895 |
| 10,294,028 | B2 * | 5/2019 | Hamilton | B65G 1/0492 |
| 10,618,735 | B1 * | 4/2020 | Oh | B65G 1/137 |
| 10,657,492 | B1 * | 5/2020 | Wei | G06Q 10/0875 |
| 10,706,387 | B1 * | 7/2020 | Cui | G06Q 30/0643 |
| 10,807,800 | B2 * | 10/2020 | Hamilton | B65G 1/1375 |
| 10,997,554 | B1 | 5/2021 | McMaster et al. | |
| 11,137,742 | B2 * | 10/2021 | Wise | G05B 19/418 |
| 11,345,546 | B2 * | 5/2022 | Cacioppo | G05B 15/02 |
| 11,676,101 | B2 | 6/2023 | Kreis et al. | |
| 2002/0069134 | A1 | 6/2002 | Solomon | |
| 2004/0044557 | A1 * | 3/2004 | Frech | G09B 19/18 434/219 |
| 2005/0060243 | A1 * | 3/2005 | Whetman | G06Q 10/087 705/28 |
| 2005/0075949 | A1 * | 4/2005 | Uhrig | G06Q 10/087 705/28 |
| 2008/0162298 | A1 | 7/2008 | Aliabadi et al. | |
| 2009/0082902 | A1 * | 3/2009 | Foltz | G06Q 10/087 700/214 |
| 2009/0164343 | A1 * | 6/2009 | Hurtis | G06Q 10/087 705/28 |
| 2009/0319401 | A1 * | 12/2009 | Rao | G06Q 10/087 705/29 |
| 2013/0173049 | A1 * | 7/2013 | Brunner | G06Q 10/08 700/216 |
| 2014/0100715 | A1 * | 4/2014 | Mountz | G06Q 10/087 701/2 |
| 2014/0365258 | A1 * | 12/2014 | Vestal | G05D 1/0297 901/1 |
| 2015/0368044 | A1 | 12/2015 | Olson | |
| 2016/0275428 | A1 * | 9/2016 | Halbrook | G06Q 10/06315 |
| 2017/0158431 | A1 * | 6/2017 | Hamilton | B65G 1/1375 |
| 2017/0348857 | A1 * | 12/2017 | Vasquez | B23P 19/001 |
| 2018/0084242 | A1 * | 3/2018 | Rublee | G06T 17/00 |
| 2018/0218320 | A1 | 8/2018 | Lee et al. | |
| 2019/0283252 | A1 * | 9/2019 | Skaaksrud | G06Q 10/0836 |
| 2019/0325377 | A1 | 10/2019 | Rajkhowa | |
| 2019/0340561 | A1 | 11/2019 | Rajkhowa | |
| 2020/0030967 | A1 * | 1/2020 | Goodwin, III | B65G 1/0492 |
| 2020/0094997 | A1 * | 3/2020 | Menon | B65B 57/14 |
| 2020/0095001 | A1 * | 3/2020 | Menon | B25J 9/1687 |
| 2020/0279217 | A1 * | 9/2020 | Gravelle | G06Q 10/063 |
| 2020/0302391 | A1 * | 9/2020 | Li | G06Q 30/0635 |
| 2020/0310391 | A1 | 10/2020 | Cole et al. | |
| 2020/0311644 | A1 * | 10/2020 | Willard, III | G06Q 30/0601 |
| 2020/0357040 | A1 | 11/2020 | Patel et al. | |
| 2021/0049037 | A1 * | 2/2021 | Kattepur | B25J 9/1664 |
| 2021/0061566 | A1 | 3/2021 | Cacioppo et al. | |
| 2021/0090106 | A1 * | 3/2021 | Gu | G06Q 50/28 |
| 2021/0110461 | A1 * | 4/2021 | Wang | G06Q 30/0202 |
| 2021/0192660 | A1 * | 6/2021 | Delgado | G06F 30/17 |
| 2021/0248548 | A1 * | 8/2021 | Guhya | G06T 7/62 |
| 2022/0048707 | A1 * | 2/2022 | Matl | B65G 1/1378 |
| 2022/0088778 | A1 * | 3/2022 | Sun | B25J 9/1653 |
| 2022/0092541 | A1 | 3/2022 | Cacioppo et al. | |
| 2022/0179416 | A1 * | 6/2022 | Cacioppo | G05D 1/0088 |
| 2022/0230125 | A1 * | 7/2022 | Vedantam | G06Q 10/20 |
| 2022/0306387 | A1 | 9/2022 | Roth | |
| 2022/0315353 | A1 * | 10/2022 | Sun | B25J 9/1676 |
| 2022/0405697 | A1 | 12/2022 | Kreis et al. | |
| 2022/0405705 | A1 | 12/2022 | Kreis et al. | |
| 2023/0004156 | A2 * | 1/2023 | Cacioppo | G05D 1/0061 |

OTHER PUBLICATIONS

Pavlichenko, Dymtro et al., KittingBot: A Mobile Manipulation Robot for Collaborative Kitting in Automotive Logistics 15th International Conference on Intelligent Autonomous Systems, Jun. 2018 (Year: 2018).*
Boudella, Mohamed El Amine et al., Modeling kitting operations in a semi-robotic environment 7th IESM Conference, Oct. 2017 (Year: 2017).*
Bottin, Matteo et al., Sales Kit Automated Production: An Integrated Procedure for Setup Reduction in Case of High Products Variety, Applied Sciences, vol. 11, 2021 (Year: 2021).*
Crosby, Matthew et al., Integrating Missing, Logistics, and Task Planning for Skills-Based Robot Control in Industrial Kitting Applications, Proceedings of the 34th Workshop of UK Planning and Scheduling Special Interest Group, 2017 (Year: 2017).*
Oracle Warehouse Management Cloud—User Guide—Release 20c Oracle, 2020 (Year: 2020).*
Quante, Rainer, Management of Stochastic Demand in Make-to-Stock Manufacturing Peter Lang Publishing, 2018 (Year: 2018).*
Caputo, Antonio C. et al., A model for kitting operations planning Assembly Automation, vol. 35, No. 1, 2015 (Year: 2015).*
Kitting: optimizing assembly in the warehouse InterlakeMecalux.com, Dec. 22, 2020 (Year: 2020).*
Ramaraj, Goutham et al., A Two-Stage Stochastic Programming Model for Production Planning in a Kitting Facility Under Demand and Yield Uncertainties, Proceedings of the 2017 Industrial and Systems Engineering Conference, 2017 (Year: 2017).*
Simren, Olof, Assemble to Order with Inventory Picks and Movements Microsoft Dynamics NAV & 365 Business Central Blog, May 20, 2015 (Year: 2015).*
Soman, Cheta Anil et al., Comparison of dynamic scheduling policies for hybrid make-to-order and make-to-stock production systems with stochastic demand, International Journal of Production Economics, vol. 104, 2006 (Year: 2006).*
Beemsterboer, Bart et al, Hybrid MTO-MTS production planning: An explorative study European Journal of Operational Research, vol. 248, 2016 (Year: 2016).*
Mruby, Alexander, Inventory Control in Hybrid Make-to-order-Make-to-stock Multiproduct Manufacturing System Lund University, 2019 (Year: 2019).*
Zhang, George Zhe et al., Dynamic pooling of make-to-stock and make-to-order operations International Journal of Production Economics, vol. 144, 2013 (Year: 2013).*

(56) References Cited

OTHER PUBLICATIONS

Kaminksy, Phillip et al., Combined make-to-order/make-to-stock supply chains IIE Transactions, vol. 41, 2009 (Year: 2009).*

Microsoft Dynamics 365 Business Central: Assembly Management (Kitting) without the need of manufacturing functionality https://yzhums.com/4491/, Oct. 30, 2020, Retrieved from Archive.org (Year: 2020).*

Atan, Zumbul et al., Assemble-to-order systems: A review European Journal of Operations Research, vol. 261, 2017 (Year: 2017).*

Microsoft Dynamics 365 Business Central Manual Microsoft, 2019 (Year: 2019).*

United States Patent and Trademark Office, "Non-Final Office Action," issued in connection with U.S. Appl. No. 17/378,406, dated Sep. 20, 2022, 19 pages.

United States Patent and Trademark Office, "Non-Final Office Action," issued in connection with U.S. Appl. No. 17/378,460, dated Jul. 27, 2022, 13 pages.

Rheude, "Kitting Process Flow in Fulfillment," Aug. 31, 2021, available at https://redstagfulfillment.com/kitting-process-flow-in-fulfillment/, 9 pages.

"What is Kitting? A look at the Order Fulfillment Strategy," Nov. 2, 2020, available at https://www.electronicfasteners.com/what-is-kitting-a-look-at-the-order-fulfillment-strategy/, 2 pages.

United States Patent and Trademark Office, "Notice of Allowance and Fee(s) Due," issued in connection with U.S. Appl. No. 17/378,460, dated Dec. 8, 2022, 7 pages.

United States Patent and Trademark Office, "Corrected Notice of Allowability," issued in connection with U.S. Appl. No. 17/378,460, dated Feb. 8, 2023, 2 pages.

United States Patent and Trademark Office, "Final Office Action," issued in connection with U.S. Appl. No. 17/378,406, dated Mar. 9, 2023, 24 pages.

United States Patent and Trademark Office, "Advisory Action," issued in connection with U.S. Appl. No. 17/378,406, dated Jun. 20, 2023, 3 pages.

United States Patent and Trademark Office, "Notice of Allowance and Fee(s) Due," issued in connection with U.S. Appl. No. 17/378,460, dated Apr. 5, 2023, 5 pages.

United States Patent and Trademark Office, "Corrected Notice of Allowability," issued in connection with U.S. Appl. No. 17/378,460, dated May 5, 2023, 2 pages.

United States Patent and Trademark Office, "Non-Final Office Action", issued in connection with U.S. Appl. No. 17/378,406, dated Aug. 29, 2023, 28 pages.

United States Patent and Trademark Office, "Notice of Allowance and Fee(s) Due," issued in connection with U.S. Appl. No. 17/378,406, dated May 8, 2024, 14 pages.

* cited by examiner

SYSTEMS AND METHODS FOR OPTIMIZING ASSEMBLY OF PRODUCT KITS IN AN ORDER FULFILLMENT CENTER USING AUTONOMOUS VEHICLES

RELATED APPLICATIONS

The present application claims the benefit of priority of U.S. Provisional Patent Application No. 63/211,497 filed Jun. 16, 2021, the entire contents of which are incorporated herein by reference.

TECHNICAL FIELD

Embodiments of the technology relate generally to systems and methods for dynamically managing order fulfillment and, more specifically, to managing fulfillment of kit orders.

BACKGROUND

Commerce is increasingly supported by complex systems of order fulfillment. The increase in electronic commerce, including on-line purchases and mail orders, has added to the complexity of order fulfillment. In order to efficiently and rapidly supply purchased items to purchasers, fulfillment management systems operated at fulfillment centers are used to optimize the gathering and shipping of items to purchasers. Fulfillment management systems can coordinate the work of human pickers and/or autonomous vehicles in the gathering of items for shipping.

SUMMARY

In one example embodiment, the present disclosure is directed to a computing system for managing the fulfillment of orders for kits. The computing system can include a communication device and at least one processor in communication with the communication device. The at least one processor can be configured to receive a determination that a pre-assembly kit pick job is needed to pre-assemble a kit, the kit comprising a first item and a second item, and wherein the determination is based on: (a) a number of orders for the kit during a time period; (b) a kit pre-assembly time; and (c) a kit on-demand assembly time. The at least one processor can be further configured to create the pre-assembly kit pick job to pre-assemble the kit, the pre-assembly kit pick job associated with at least one of a plurality of the first item and a plurality of the second item; and transmit, via the communication device, the pre-assembly kit pick job to at least one autonomous vehicle.

Example embodiments of the foregoing computing system can include one or more of the following features. The pre-assembly kit pick job can direct the at least one autonomous vehicle to a first inventory location for collecting the plurality of the first item and to a second inventory location for collecting the plurality of the second item. After collecting the plurality of the first item and the plurality of the second item, the pre-assembly kit pick job can direct the at least one autonomous vehicle to one of a kit assembly station and a pack-out station. The at least one processor can be further configured to receive a second determination that a second pre-assembly kit pick job is unnecessary based on new order data for the kit during a second time period, the new order data reflecting a decrease in demand for the kit.

In another example of the foregoing computing system, the determination that the pre-assembly kit pick job is needed to pre-assemble the kit can be received from one of an e-commerce computing system and a fulfillment management system. The e-commerce computing system can receive the kit pre-assembly time and the kit on-demand assembly time from the fulfillment management system.

In another example of the foregoing computing system, the determination that the pre-assembly kit pick job is needed to pre-assemble the kit can be further based on: historical order data for the kit; and a predicted number of orders for the kit. The kit pre-assembly time can be calculated based on historical data for gathering the first item, historical data for gathering the second item, and historical data for pre-assembling the kit. Similarly, the kit on-demand assembly time can be calculated based on historical data for gathering the first item, historical data for gathering the second item, and historical data for assembling the kit on demand.

In another example of the foregoing computing system, the determination that the pre-assembly kit pick job is needed to pre-assemble the kit can be performed by a machine learning algorithm, wherein the machine learning algorithm is trained using one or more of: historical order data for the kit; historical data for the kit pre-assembly time; and historical data for the kit on-demand assembly time.

In another example embodiment, the present disclosure is directed to a method of managing the fulfillment of orders for kits. The method can comprise receiving, by at least one processor, a determination that a pre-assembly kit pick job is needed to pre-assemble a kit, the kit comprising a first item and a second item, and wherein the determination is based on: (a) a number of orders for the kit during a time period; (b) a kit pre-assembly time; and (c) a kit on-demand assembly time. The method can further comprise creating, by the at least one processor, the pre-assembly kit pick job to pre-assemble the kit, the pre-assembly kit pick job associated with at least one of a plurality of the first item and a plurality of the second item; and transmitting, via a communication device, the pre-assembly kit pick job to at least one autonomous vehicle.

Example embodiments of the foregoing method can include one or more of the following features. The pre-assembly kit pick job can direct the at least one autonomous vehicle to a first inventory location for collecting the plurality of the first item and to a second inventory location for collecting the plurality of the second item. After collecting the plurality of the first item and the plurality of the second item, the pre-assembly kit pick job can direct the at least one autonomous vehicle to one of a kit assembly station and a pack-out station. The foregoing method can further comprise receiving, by the at least one processor, a second determination that a second pre-assembly kit pick job is unnecessary based on new order data for the kit during a second time period, the new order data reflecting a decrease in demand for the kit.

In another example of the foregoing method, the determination that the pre-assembly kit pick job is needed to pre-assemble the kit can be received from one of an e-commerce computing system and a fulfillment management system. The e-commerce computing system can receive the kit pre-assembly time and the kit on-demand assembly time from the fulfillment management system.

In another example of the foregoing method, the determination that the pre-assembly kit pick job is needed to pre-assemble the kit can be further based on: historical order data for the kit; and a predicted number of orders for the kit. The kit pre-assembly time can be calculated based on historical data for gathering the first item, historical data for gathering the second item, and historical data for pre-assembling the kit. Similarly, the kit on-demand assembly time can be calculated based on historical data for gathering the first item, historical data for gathering the second item, and historical data for assembling the kit on demand.

In another example of the foregoing method, the determination that the pre-assembly kit pick job is needed to pre-assemble the kit can be performed by a machine learning algorithm, wherein the machine learning algorithm is trained using one or more of: historical order data for the kit; historical data for the kit pre-assembly time; and historical data for the kit on-demand assembly time.

In another example embodiment, the present disclosure is directed to a non-transitory computer-readable medium having instructions stored thereon that, when executed by one or more computer processors, cause the computer processors to perform operations. The operations can comprise receiving a determination that a pre-assembly kit pick job is needed to pre-assemble a kit, the kit comprising a first item and a second item, and wherein the determination is based on: (a) a number of orders for the kit during a time period; (b) a kit pre-assembly time; and (c) a kit on-demand assembly time. The operations can further comprise creating the pre-assembly kit pick job to pre-assemble the kit, the pre-assembly kit pick job associated with at least one of a plurality of the first item and a plurality of the second item; and transmitting the pre-assembly kit pick job to at least one autonomous vehicle.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of the disclosed systems and methods and therefore are not to be considered limiting of the scope of this disclosure. The principles illustrated in the example embodiments of the drawings can be applied to alternate systems and methods. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figure 1A:
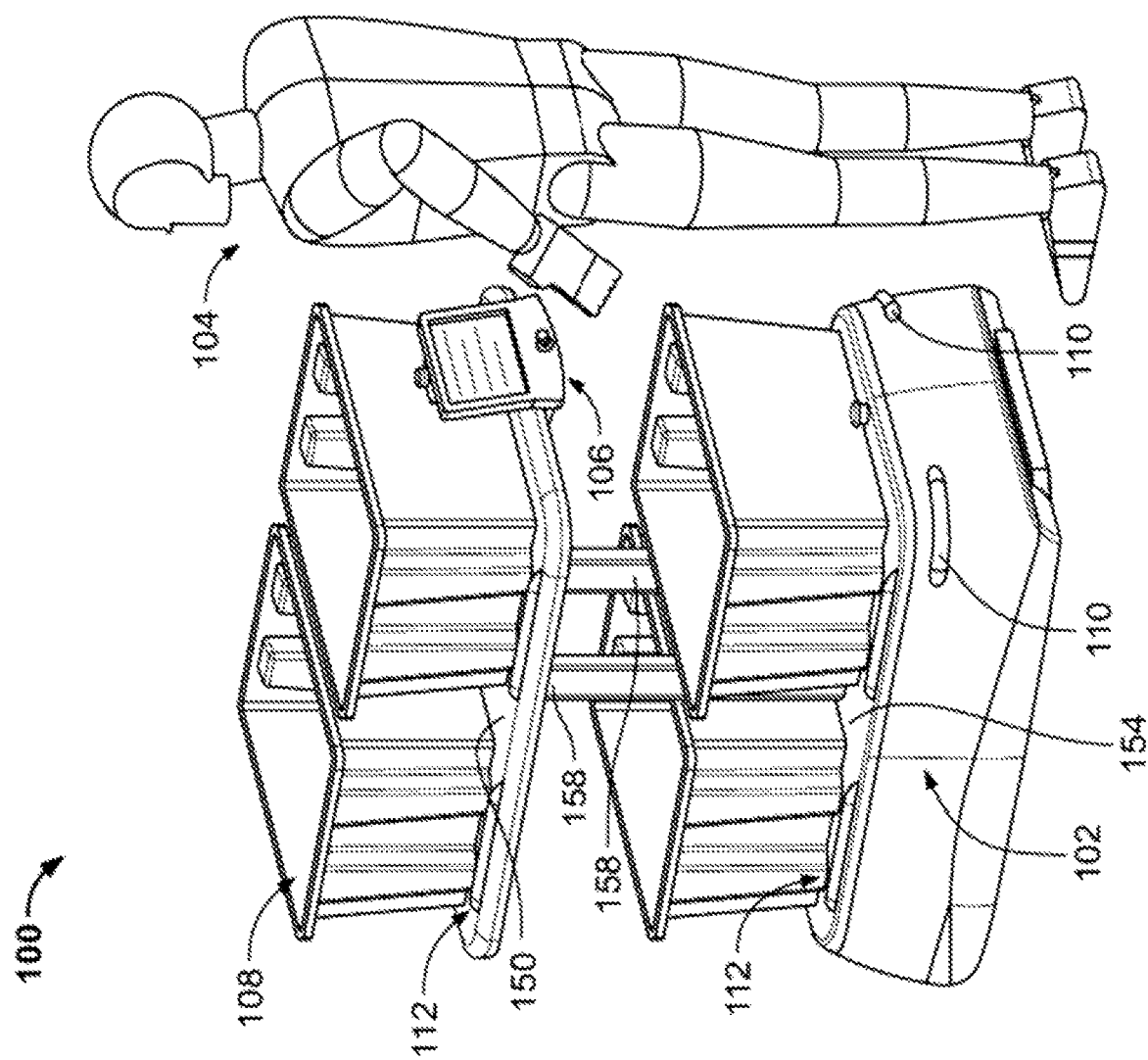
FIG. 1A is an illustration of an autonomous vehicle configured to collect items for an order in accordance with an example embodiment of the disclosure.

The example embodiments discussed herein are directed to systems and methods for managing the collection of items to fulfill customer orders. The fulfillment management system at a fulfillment center must consider a multitude of variables in optimizing the operation of the fulfillment center for efficiency. Variables the fulfillment management system can address include the numbers of available autonomous vehicles and workers, the availability of inventory to fulfill the received orders, the received orders and the corresponding dates on which the customers expect to receive their orders, the location of inventory within the fulfillment center, the routing of autonomous vehicles within the fulfillment center to collect items, the time required to collect items for an order, the packing of items for an order at a sorting, kitting, or pack-out station, and cutoff times for providing a packed order to a courier for shipping of the packed order. Additionally, the fulfillment center often has service level agreements with merchants that require fulfillment of a certain number of orders each day.

Customer orders can include a single item, multiple items, or a kit of items. As used herein, a "kit" refers to a collection of at least two items and an "item" encompasses any product that may be gathered at a fulfillment center for shipping to a customer. The items in a kit are typically bundled in a package to form the kit. In some cases, the kit may be associated with a promotional offer from a merchant to increase sales. In addition to the two or more items, the kit may include other materials such as a promotional insert, a coupon, or custom packaging items such as tissue paper or a unique packaging box. The two or more items and, if applicable, the additional materials can be bundled into a package to form the kit. Managing the creation and collection of kits within the fulfillment center introduces additional complexities the fulfillment management system must address.

One challenge that fulfillment management systems seek to address is gathering and shipping items and kits efficiently. In contrast to fulfilling orders for individual items, managing the fulfillment of kits adds complexity because the kits have multiple items and the kits typically have unique packaging and packaging instructions. The multiple items and unique packaging and packaging instructions create additional work for the fulfillment center. Fulfillment centers commonly fulfill hundreds or thousands of orders for kits and the additional work associated with each kit can dramatically increase the overall work for the fulfillment center.

The complexities associated with kits can consume a disproportionate amount of the fulfillment center's valuable resources, including the autonomous vehicles, the workers, and the computing systems that operate the fulfillment center. In particular, the need to coordinate the logistics of gathering the multiple items and additional materials for kits and the creation of the kits consumes additional processing and memory of the fulfillment center's computing systems along with the time of workers and the energy of autonomous vehicles. If resources are devoted to creating more kits than are needed, the fulfillment center does not operate efficiently. Conversely, if the fulfillment center does not plan ahead by creating a sufficient number of kits and there is a shortfall, then resources may need to be reallocated on an urgent basis, which can be inefficient. Therefore, effectively managing the creation of kits, including the collection of the items and additional materials used in kits, can improve the overall operation of the fulfillment center.

The fulfillment management system of a fulfillment center can optimize efficiency by dynamically adjusting the number of kits available to fulfill orders. For example, if the demand for kits is relatively low, the fulfillment management system may adopt a kit on-demand approach to assembling kits. In a kit on-demand approach, the fulfillment management system arranges for assembly of a kit as an order for the kit is fulfilled. If the ordered kit requires a first item and a second item, the fulfillment management system can first identify the SKU for each of the first and second item. The fulfillment management system then can use the individual SKUs to create a pick job for the collection of the first item and the second item. After collection, the first item and the second item are bundled into the kit in accordance with any instructions for assembling the kit. For example, instructions may specify how the first and second items, as well as any additional materials, are to be arranged in the kit box. In some cases, the items are bundled at a designated kitting station. However, implementing a kitting station in the kit on-demand approach introduces an additional operation into the fulfillment process and reduces efficiency. Accordingly, with the kit on-demand approach generally it is preferred that the items are bundled at a pack-out station where items and kits are packaged for shipping.

In contrast to the kit on-demand approach, if the demand for kits is relatively high or is expected to become high, the fulfillment management system may adopt a kit pre-assembly approach to assembling kits. In a kit pre-assembly approach, the fulfillment management system arranges for a number of kits to be pre-assembled by collecting a bulk amount of the items required for the kit. The items are pre-assembled into kits and the kits are stored at an inventory location in the fulfillment center so that the kits can be readily available for future orders. In some cases, the pre-assembled kits will be assigned their own SKU so they can be treated similarly to individual items having their own SKU at the fulfillment center. When an order for a kit is received, the order can be fulfilled by creating a pick job for collecting the pre-assembled kit from its inventory location instead of collecting the individual items that make up the kit as in the kit on-demand approach. The pre-assembled kit may also be located at a staging location for kits.

Each of the foregoing approaches has advantages and efficiency tradeoffs. The kit on-demand approach typically requires additional pick time because items are picked individually and there may be additional packing time if the worker performing the packing is not familiar with the kit packing instructions. However, the kit on-demand approach can be advantageous in certain situations because it does not require the initial time invested in collecting a bulk amount of items and pre-assembling kits. The kit on-demand approach also avoids the uncertainty as to whether actual demand for the kits will match the expected demand. On the other hand, while the kit pre-assembly approach requires an initial time investment, the pre-assembling of the kits can be performed during periods of lower activity at the fulfillment center. Additionally, gathering items in bulk and pre-assembling the items into kits on a large scale is typically more efficient from a time and resources perspective. Choosing between the kit on-demand approach and the kit pre-assembly approach can have a dramatic impact on the efficiency of a fulfillment center that handles thousands of orders per day.

Accordingly, fulfillment management systems that more effectively manage the fulfillment of kit orders would be beneficial.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Enhanced Cart System Used in Example Embodiments

FIG. 1A illustrates an enhanced cart system 100 that can be used in the example embodiments described herein. The enhanced cart system 100 includes an enhanced cart 102 (also referred to as a picking cart) that can be an autonomous vehicle, a semi-autonomous vehicle, or simply a wheeled cart that is moved by a worker 104. The enhanced cart system 100 can include a user interface 106 (e.g. a touch screen, a tablet device, a personal digital assistant, a scanning device, etc.), indicator lights 110, 112, and one or more audio speakers that assist the worker accompanying the enhanced cart system 100. The enhanced cart 102 can be propelled by a motor (e.g., an electric motor) that is coupled to a power source (e.g., a battery, a supercapacitor, etc.) that can be periodically recharged. Workers within a fulfillment center can use enhanced carts to move inventory within the fulfillment center. The workers can be humans, robots, or a combination of humans and robots. Workers can use enhanced carts for tasks such as picking, re-stocking, moving, sorting, counting, or verifying items. In some cases, kitting items or a portion of the process of kitting items, such as placing two items in a box, can be performed on the enhanced cart.

As illustrated in FIG. 1A, one or more storage containers 108 (also referred to as totes) may be placed on the enhanced cart 102 for containing items gathered throughout the fulfillment center. The gathering and placement of items into the storage containers 108 can be done by workers, can be automated by machines, or can be performed through a combination of workers and machines. The storage containers 108 are also removable from the enhanced cart 102, such as when the storage containers holding the gathered items arrive at a pack-out station for packing and shipping. In some cases, each storage container 108 can be used for a single order. In other cases, a storage container 108 can be used for batch picking where the container holds multiple complete or partial orders that are delivered to a post-pick station for sorting, kitting, processing, and/or packing. Hybrid approaches are possible in some cases where one storage container 108 on the enhanced cart 102 is for a single order while another storage container on the same enhanced cart 102 is used for batch picking. In some cases, the single order may be a time sensitive order, whereas the batch picking is associated with a pick job for kit pre-assembly or with orders that are less time sensitive. In yet other cases, the storage containers 108 can be used for items that are to be counted or items that are to be moved or re-stocked within the fulfillment center.

Figure 1B:
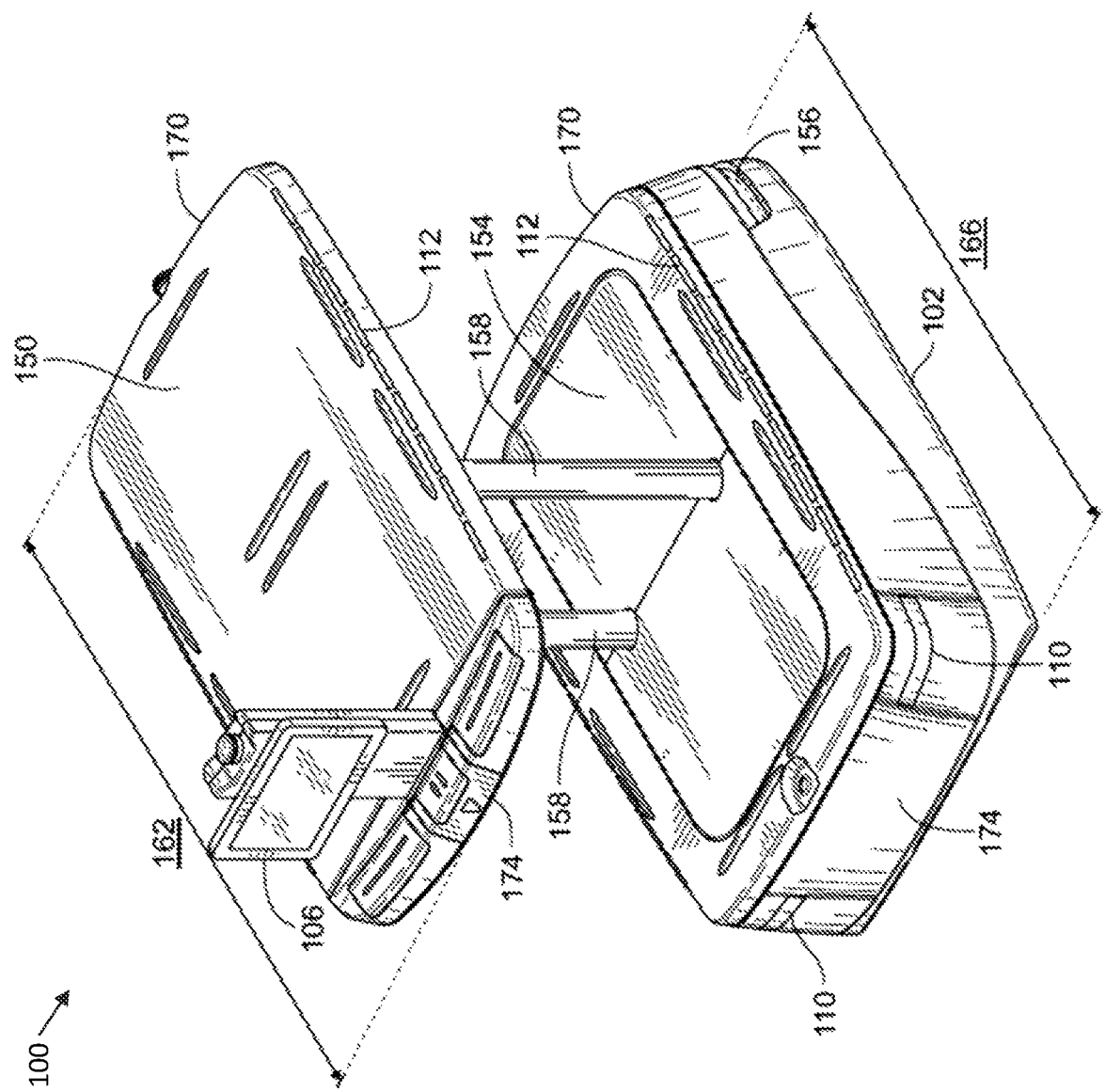
FIG. 1B is an illustration of another autonomous vehicle configured to collect items for an order in accordance with an example embodiment of the disclosure.

FIG. 1B illustrates another example of an enhanced cart system 100, but with the storage containers removed for purposes of illustration. As with the example of FIG. 1A, the enhanced cart system 100 of FIG. 1B includes an enhanced cart 102 having a user interface 106 and indicator lights 110, 112. The enhanced cart 102 of both FIGS. 1A and 1B can include upper and lower platforms 150, 154 on which the storage containers 108 can be placed. At least one support 158 can support the upper platform 150 above the lower platform 154. The at least one support 158 can be substantially centrally-located along the respective lengths 162, 166 of the upper and lower platforms 150, 154 between the front end 170 and back end 174 of the enhanced cart 102. As illustrated in FIG. 1B, the front end 170 of the enhanced cart 102 can define a recess 156. One or more sensors (e.g., light detecting and range detecting) can be housed within the recess 156. The recess 156 permits the one or more sensors to have a field of detection in front of and to the side of the enhanced cart 102.

The following discussion will describe the use of enhanced cart systems to efficiently manage orders for kits within a fulfillment center. While the examples that follow refer to the specific example of an autonomous vehicle for the enhanced cart system, it should be appreciated that carts of varying complexity and features can be used in the described examples.

Fulfillment Management System

Figure 2:
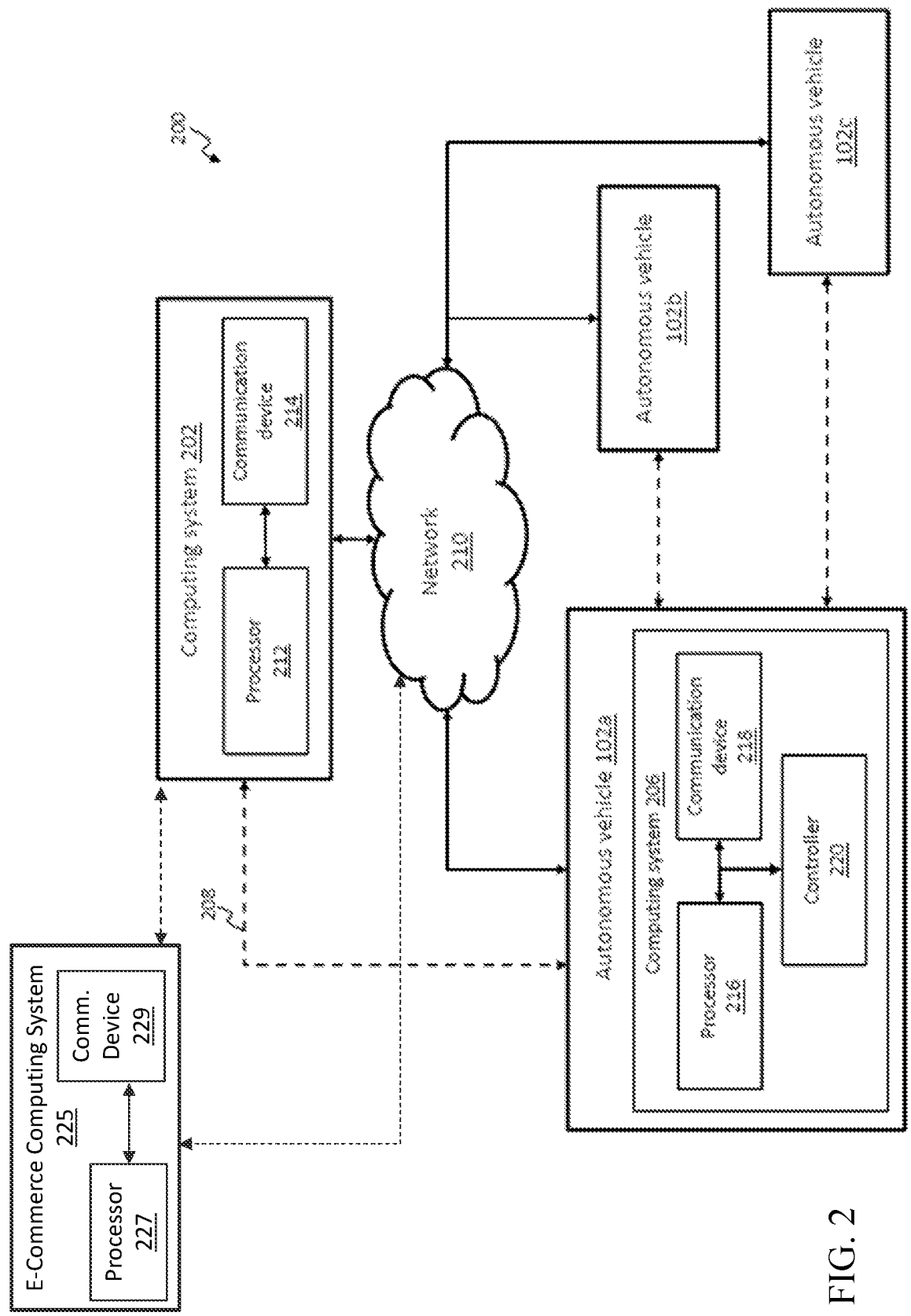
FIG. 2 is a block diagram of a system for managing order fulfillment in accordance with an example embodiment of the disclosure.

FIG. 2 illustrates a block diagram of a fulfillment management system 200 configured to manage orders within one or more fulfillment centers. The fulfillment management system 200 can receive customer orders from an order processing system and the order processing system can receive orders from customer devices (e.g. phones, smartphones, computers). In an alternative embodiment, the fulfillment management system can be a part of the order processing system. In the example embodiment illustrated in FIG. 2, the order processing system is an e-commerce computing system 225. In some examples, the e-commerce computing system 225 can organize orders for fulfillment by identifying the availability at the fulfillment center of items within the order. The fulfillment management system 200 can place orders and items in groupings, which can be referred to as pick jobs, for use in gathering the items from the fulfillment center.

The fulfillment management system 200 can include a computing system 202 configured to be coupled directly or indirectly to one or more autonomous vehicles 102a, 102b, and 102c (collectively referred to as 102) such as the autonomous vehicles described in connection with FIGS. 1A and 1B. In one example, the computing system 202 can communicate directly with the vehicle computing system 206 of an autonomous vehicle 102 via a communication channel 208. Additionally, or alternatively, the computing system 202 can communicate with one or more autonomous vehicles 102 via a network device of network 210. In some embodiments, computing system 202 can communicate with a first autonomous vehicle (e.g., vehicle 102a) via a second autonomous vehicle (e.g. vehicle 102b).

The computing system 202 of the example fulfillment management system 200 can be located locally at the fulfillment center, can be located remotely from the fulfillment center (e.g., hosted in a cloud computing system), or can be distributed with components located both locally and remotely. As shown in FIG. 2, example computing system 202 can include a processor 212 that communicates with a communication device 214. The communication device 214 can receive messages from and transmit messages to the processor 212, the e-commerce computing system 225, and the autonomous vehicles 102. Similar to the computing system 202, the e-commerce computing system 225 can comprise one or more processors 227 and a communication device 229.

With respect to communications the computing system sends to the autonomous vehicles 102, the messages can include picking instructions (e.g., product or kit name, product or kit description, product or kit image, quantity, location within the fulfillment center), navigation instructions, and shipping deadlines. Messages the autonomous vehicles 102 can transmit to the communication device 214 include confirmations when an item or kit is picked or a pick job is complete and exception messages indicating that an item or kit is not available for collection at an inventory location within the fulfillment center. The messages can be visual and/or audible and can be communicated using the user interface 106, the indicator lights 110, 112, or an audio speaker.

The example system of FIG. 2 also illustrates certain components of example autonomous vehicle 102a. Example autonomous vehicle 102a can include a vehicle computer system 206 that comprises a vehicle processor 216, a vehicle communication device 218, and a vehicle controller 220. The vehicle communication device 218 can communicate with communication device 214 via channel 208 or via network 210. The vehicle processor 216 can process signals from the communication device 214, from the vehicle communication device 218, and from other components onboard the autonomous vehicle 102a such as light detecting or range detecting sensors. The vehicle controller 220 can send control signals to components onboard the autonomous vehicle 102a such as a navigation system that controls the movement of the autonomous vehicle 102a. As one example, the vehicle computer system 206 can receive a job from computing system 202, wherein the job identifies one or more items or kits to be retrieved and inventory locations (e.g., bins or shelves) for the one or more items or kits within the fulfillment center. The vehicle controller 220 and the navigation system can use the location information associated with the one or more items or kits to navigate the autonomous vehicle to the inventory location containing the one or more items or kits. The other autonomous vehicles 102b, 102c can include components similar to those shown on autonomous vehicle 102a.

Determining a Need to Pre-Assemble a Kit

When the computing system 202 transmits a pick job to an autonomous vehicle 102, the pick job can identify items and kits for collection and placement in the storage containers 108. If the demand for kits is changing or is expected to change, the fulfillment management system 200 can evaluate whether a kit on-demand approach or a kit pre-assembly approach would optimize efficiency in fulfilling orders for the kits.

Choosing between the kit-on-demand approach and the kit pre-assembly approach can depend upon a number of orders that are received or predicted to be received for the kit as well as the time associated with each approach. The kit on-demand approach and the kit pre-assembly approach each have an associated amount of time required to fulfill the order for the kit. The time associated with each approach can be based on the availability of the items in the kit, the number of items in the kit, whether the kit includes additional materials, the complexity of assembling the kit, the locations of the items within the fulfillment center, the availability of autonomous vehicles and/or human pickers to collect the items, and the level of activity within the fulfillment center, among other factors.

Striking the appropriate balance between the kit-on-demand approach and the kit pre-assembly approach can dramatically improve the efficiency of a busy fulfillment center that supplies hundreds of kits in a given day. While the kit pre-assembly approach can provide efficiencies over the kit-on-demand approach in the time needed to gather the items and assemble them into kits, it requires additional computing resources associated with logistics and records management involved in gathering large groups of items and assembling them into kits that typically are assigned a kit SKU and stored in a separate inventory location. On the other hand, the kit-on-demand approach also has resource demands in that it is typically less time efficient than the kit pre-assembly approach and, if the need for kits is urgent, speed is prioritized over efficiency in the deployment of the workers and autonomous vehicles. Accordingly, managing the decision between the kit-on-demand and kit pre-assembly approaches impacts resources throughout the fulfillment center.

Figure 3:
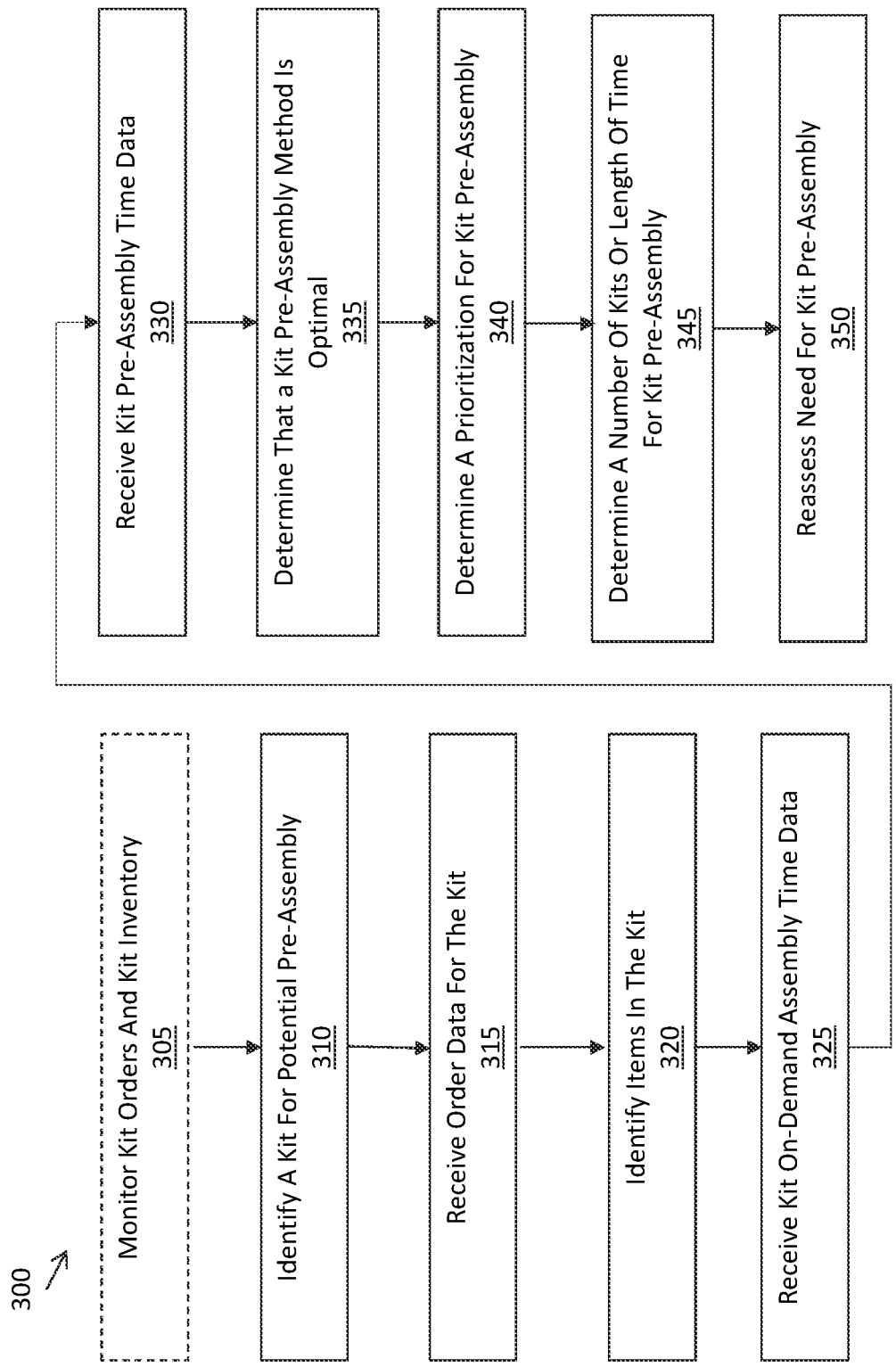
FIG. 3 is a flow chart illustrating a method for managing the fulfillment of kit orders in accordance with an example embodiment of the disclosure.

Turning to FIG. 3, an example method 300 is illustrated that addresses choosing between a kit on-demand approach or a kit pre-assembly approach. The operations of example method 300 can be implemented as computer-readable instructions executed by computing system 202 and/or e-commerce computing system 225. It should be understood that in alternate embodiments certain operations of method 300 can be combined, performed in parallel, or performed in a different sequence and that other operations may be added to method 300.

In operation 305 of example method 300, computing system 202 can monitor received kit orders and kit inventory to determine whether there is sufficient inventory to meet the demand for kits. The monitoring can be performed at any desired frequency, including but not limited to daily, hourly, several times an hour, or at the beginning of each shift change at the fulfillment center. In alternative embodiments, the monitoring can be performed in combination with or solely by the e-commerce computing system 225.

As another alternative, the monitoring in operation 305 can be omitted and the method 300 can proceed directly to operation 310 wherein a kit is identified for potential pre-assembly. For example, a predetermined threshold associated with an increase in kit orders or a low kit inventory may trigger method 300 to begin at operation 310. In another example, a manager associated with the fulfillment center or the e-commerce computing system 225 may recognize a shortage of inventory for a particular kit or an actual or expected increase in demand for a kit, such as before a holiday, and may trigger method 300 to begin at operation 310. In yet another example, the fulfillment management system 200 may identify a current or upcoming period of low activity at the fulfillment center and may want to trigger a kit pre-assembly in order to fully utilize available workers or autonomous vehicles during the period of low activity. In such a case, there may not be a near-term need for the kits, but the kits can be pre-assembled in anticipation of a future need.

Once a kit has been identified for potential pre-assembly in operation 310, the fulfillment management system and/or the e-commerce computing system 225 can gather data to determine whether the identified kit should be pre-assembled or whether resources are better devoted to pre-assembling a different kit or performing other work at the fulfillment center. In operation 315, the computing system 202 can receive order data for the kit to assess the demand for the kit. The order data can include current orders for the kit, historical order data for the kit that can encompass previous months or years. The order data can also comprise predicted orders for the kit. In some cases, a machine learning algorithm can be trained using historical order data and can be used to predict the demand for the kit. In certain example embodiments, the computing system 202 can receive order data from the e-commerce computing system 225.

In operation 320, the computing system 202 can identify the items in the kit that is being evaluated for potential pre-assembly. Identifying the items in the kit allows the computing system to gather the kit assembly time data referenced in operations 325 and 330. In operation 325, the computing system 202 can gather timing data associated with assembling the kit on demand. This data can include the time required to pick the individual items for the kit as well as the time required to assemble the kit at a pack-out station. The time required to pick the individual items and assemble the kit can depend on the location of the items and the activity level in the fulfillment center, the number of items, the complexity of the kit, and the available workers and autonomous vehicle resources. The data associated with assembling the kit on demand can be collected from historical records or can be filtered to more accurately correspond with expected conditions at the fulfillment center. In some cases, the available data or selected data can be averaged. The computing system 202 can use the available data to determine an actual or an estimated time required for on-demand assembly of the kit.

Similarly, in operation 330, the computing system 202 can gather timing data associated with pre-assembling the kit. For example, the computing system 202 can gather historical data associated with gathering the items of the kit in bulk and pre-assembling the bulk items into kits. The timing data may reflect or be adjusted to reflect a learning curve whereby workers can assemble the kits more efficiently over time as they gain experience with the kits. In some cases, if historical data for pre-assembling bulk items into the kit is not available, the computing system 202 can estimate the time associated with pre-assembly of the kit based on actual data for gathering the items and assembling the kit on-demand. The computing system 202 can use a predetermined number of kits that are to be pre-assembled, such as 25, or 50, or 100, as the number of kits that are pre-assembled will affect efficiency with greater numbers of kits generally yielding greater efficiency. In some cases, the available data or the estimated data can be averaged. The computing system 202 can use the available data to determine an actual or an estimated time required for pre-assembly of the kit.

In operation 335, the computing system 202 can compare the time data associated with each of the on-demand kit approach and the pre-assembled kit approach to determine which is optimal for the particular kit at that time. In some cases, a machine learning algorithm can be used to determine whether the pre-assembly of a kit is preferable. The machine learning algorithm can be trained using one or more of historical order data, historical data for the kit pre-assembly time, and historical data for the kit on-demand assembly time. If the computing system 202 determines that the pre-assembly of the kit is optimal, it can then determine the specific implementation for the pre-assembly of the kit. In operation 340, the computing system 202 can determine a prioritization for the kit pre-assembly. For example, if there is an immediate or near-term need for the kit, the computing system 202 can assign a high prioritization to the kit pre-assembly and can promptly generate pick jobs to complete the kit pre-assembly. Alternatively, if the purpose of the kit pre-assembly is to build an inventory of the kits during a period of lower activity at the fulfillment center, the kit pre-assembly work can be assigned a lower prioritization and pre-assembly kit pick jobs can be assigned when workers or autonomous vehicles are in need of work.

Related to the prioritization of the kit pre-assembly, in operation 345, the computing system 202 can determine a number of kits to pre-assemble or a length of time during which the kit pre-assembly work is to be performed. For example, based on the order data collected for the kit in connection with operation 315, if there is a current or expected high demand for the kit, the computing system 202 can designate that a large number of the kits should be pre-assembled. As another example, if a period of low activity is expected at the fulfillment center for the next three hours, the computing system 202 can set the kit pre-assembly work to be performed over the next three hours as workers and autonomous vehicles become available.

Lastly, in operation 350, the computing system 202 can periodically reassess the need to pre-assemble the kit. The computing system 202 can perform the reassessment by repeating operations 315, 325, and 330 of method 300 as new data becomes available or new conditions arise at the fulfillment center. Alternatively, the reassessment can be set to occur after a designated time or after a predetermined number of pre-assembly kit pick jobs are assigned. For example, if the actual orders for the kit received over time do not meet the number of orders that were previously expected, the computing system 202 can perform or can receive a second determination that the pre-assembly of the kit is no longer necessary. Alternatively, if demand increases unexpectedly for another kit, the computing system can terminate the pre-assembly of the originally identified kit and reallocate resources to work on pre-assembling the newly identified kit.

Because each of the kit-on-demand and kit pre-assembly approaches has certain benefits and certain resource demands, example method 300 is beneficial in managing an appropriate balance between the two approaches. Stockpiling too many kits with the kit pre-assembly approach can consume the fulfillment center's computing resources in managing the logistics involved in pre-assembling the kits and managing the records of the pre-assembled kits. Conversely, having an insufficient number of kits prepared when faced with a period of high demand can force the fulfillment center's computing systems to devote resources to reallocating pick jobs and determining approaches to meet the demand on an expedited basis. Therefore, the balanced approach of example method 300 optimizes the use of fulfillment center resources.

Creating a Pre-Assembly Kit Pick Job

Figure 4:
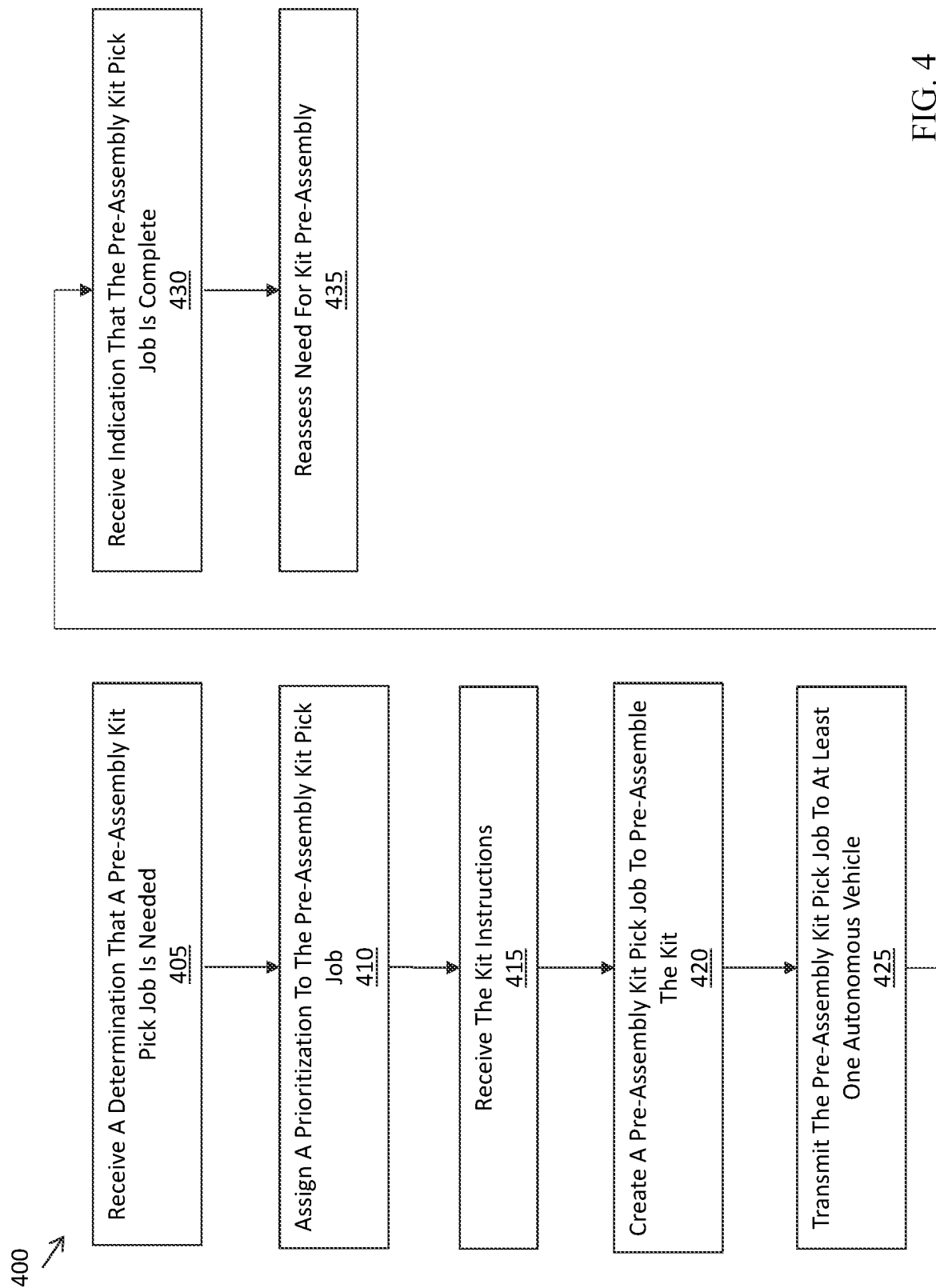
FIG. 4 is a flow chart illustrating a method for fulfilling kit orders in accordance with an example embodiment of the disclosure.

FIG. 4 illustrates an example method 400 for creating a pre-assembly kit pick job in response to the determination from method 300 of FIG. 3. The operations of example method 400 can be implemented as computer-readable instructions executed by computing system 202 and/or e-commerce computing system 225. It should be understood that in alternate embodiments certain operations of method 400 can be combined, performed in parallel, or performed in a different sequence and that other operations may be added to method 400.

Performing method 300 of FIG. 3 allows the fulfillment management system 200 to improve efficiency by identifying situations where pre-assembling a kit is advantageous. In response, in operation 405 of FIG. 4, the computing system 202 can receive the determination from method 300 that a pre-assembly kit pick job is needed for a particular kit. In operation 410, the computing system 202 can assign a prioritization to the pre-assembly kit pick job for the kit identified by method 300. If in method 300 the pre-assembly of the kit was assigned a low priority, the computing system 202 may delay creating the pre-assembly kit pick job or may assign a low prioritization to the pre-assembly kit pick job. Conversely, if the method 300 determines that the need for the kit is a high priority, the computing system 202 can assign a high prioritization to the pre-assembly kit pick job.

In operation 415, the computing system 202 can receive the kit assembly instructions associated with the kit. The kit assembly instructions can be determined by a merchant selling the kit and can accompany the order for the kit. In operation 420, the computing system 202 can create a pre-assembly kit pick job for the kit identified in method 300. The creation of the pre-assembly kit pick job can involve canceling or changing existing pick jobs. The pre-assembly kit pick job can identify the items to be collected for assembling the kit, the inventory location of the items within the fulfillment center, the number of the items to be collected, any additional materials required for the kit such as tissue paper or a unique packaging box, and the kit assembly instructions. In some cases, the pre-assembly kit pick job will be limited to collecting a bulk amount of a single item that is to be delivered to a kitting station. One or more other kit pick jobs may be specified for collecting bulk amounts of the other items for the kit that are to be delivered to the kitting station. In other words, in some cases, the pre-assembly of the kit can involve multiple kit pick jobs that gather separate items for the kit.

In operation 425, the computing system 202 can transmit, via communication device 214, the pre-assembly kit pick job to the autonomous vehicle 102. The pre-assembly kit pick job can be received by the vehicle communication device 218 and displayed for a worker on user interface 106. In some cases, the pre-assembly kit pick job displayed on the user interface 106 can show the item name, description, and/or image as well as the inventory location for the item. In some cases, the navigation system onboard the autonomous vehicle 102 can receive the inventory location and use a stored map of the fulfillment center to determine a route to the inventory location for the item. The navigation system can also direct the autonomous vehicle 102 to proceed to the inventory location using the determined route. Upon arriving at the inventory location, the autonomous vehicle, the worker, a robotic machine, or a combination of the foregoing can collect a bulk amount of the item for placing in the storage container 108. After collecting the item, the pick job may direct the autonomous vehicle and the worker to another inventory location for another item or may provide directions to a kitting station for pre-assembling the kits.

In operation 430, the computing system 202 may receive an indication (e.g., a signal, a notification, a message, etc.) that the pre-assembly kit pick job is complete. The indication may be an explicit confirmation message from the autonomous vehicle 102. Alternatively, the indication may be implied from another message, such as a message indicating the autonomous vehicle has begun working on the next pick job in its queue. In operation 435, the computing system 202 can reassess whether pre-assembling of the identified kit is still needed or optimal for the fulfillment center. In some cases, the reassessment can occur after a predetermined time. Alternatively, the reassessment can occur after the pre-assembly kit pick job is complete or after a certain number of pre-assembly kit pick jobs are complete.

Similar to operation 350 in example method 300, the reassessment can include repeating operations 315, 325, and 330 of method 300 as new data becomes available or new conditions arise at the fulfillment center. As the number of actual or predicted orders for the kits changes over time, the computing system 202 can reevaluate the need to pre-assemble the kits and can make or can receive a second determination with respect to the pre-assembly of the kit. Performing operation 435 allows the computing system 202 to adjust pick orders to optimize efficiency. The adjustment can include canceling pre-assembly kit pick jobs that are no longer necessary or modifying existing pick jobs. The greater efficiency can result in improved worker productivity, improved energy efficiency for the autonomous vehicles, and better use of the computing resources tasked with managing the logistics and records associated with kits. Optimizing the assembly of kits, whether it be on-demand assembly or pre-assembly, can significantly improve the performance of the fulfillment management system for a fulfillment center that handles hundreds and thousands of orders in a day.

Computing Systems

In certain embodiments, some or all of the processing operations described in connection with the foregoing methods can be performed by computing systems such as a personal computer, a desktop computer, a centralized computer, or cloud computing systems. As explained previously, certain operations of the foregoing methods can be performed by a combination of computing systems.

Figure 5:
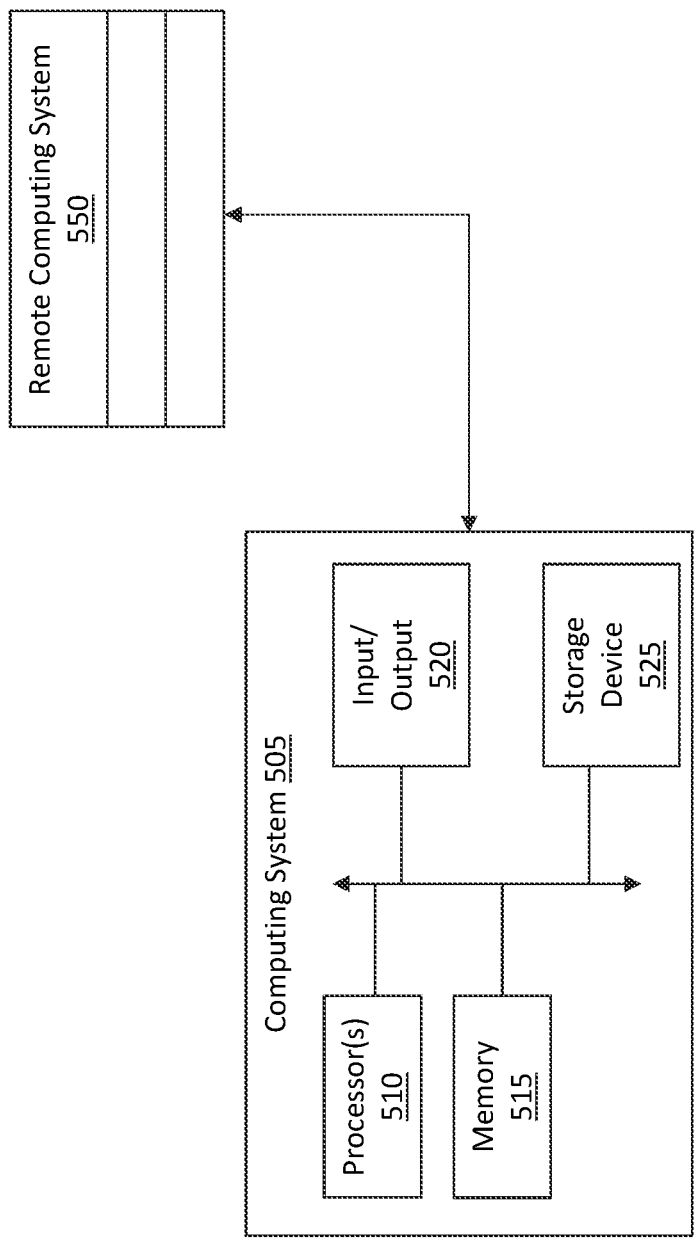
FIG. 5 is a block diagram of a computing system in accordance with an example embodiment of the disclosure.

Referring to FIG. 5, an example of a computing system is illustrated. The computing system 505 can represent a component of or one of the computing systems previously described herein, including a fulfillment management system, an order processing system, an e-commerce computing system, computing system 202, and vehicle computing system 206. Computing system 505 includes a processor 510, a memory 515, an input/output device 520, and a storage device 525. Each of the components of the computing system 505 can be interconnected, for example, by a system bus. The components of computing system 505 shown in FIG. 5 are not exhaustive, and in some embodiments, one or more of the components shown in FIG. 5 may not be included in an example system. Further, one or more components shown in FIG. 5 can be rearranged.

The processor 510 can be one or more hardware processors and can execute computer-readable instructions, such as instructions stored in memory 515. The processor 510 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 515 can store information including computer-readable instructions and data associated with the fulfillment center. The memory 515 can be cache memory, a main memory, and/or any other suitable type of memory. The memory 515 is a non-transitory computer-readable medium. In some cases, the memory 515 can be a volatile memory device, while in other cases the memory can be a non-volatile memory device.

The storage device 525 can be a non-transitory computer-readable medium that provides large capacity storage for the computing system 505. The storage device 525 can be a disk drive, a flash drive, a solid state device, or some other type of storage device. In some cases, the storage device 525 can be a database that is remote from the computing system 505. The storage device can store operating system data, file data, database data, algorithms, and software modules, as examples. In the case of the computing system 202, the storage device can store algorithms embodying the operations of the methods described herein. The storage device can also store data related to pick jobs, communications with the autonomous vehicles 102, and the performance of the fulfillment management system.

Lastly, the input/output device 520 provides an interface to other devices, such as a touch screen interface, and other computing systems such as remote computing system 550. The input/output device 520 can provide signal transfer links for communications with other devices and computing systems. The signal transfer links can include wired and/or wireless signal transfer links that transmit and receive communications via known communication protocols. For instance, the signal transfer links can provide wireless links to the autonomous vehicles 102. In some instances, the input/output device 520 can include a wired or wireless network interface device.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain operations of the methods may be performed in a different order, may be performed in parallel, or may be omitted. Moreover, in alternate embodiments additional operations may be added to the example methods described herein. Accordingly, the example methods provided herein should be viewed as illustrative and not limiting of the disclosure.

Terms such as "first" and "second" are used merely to distinguish one element or operation from another. Such terms are not meant to denote a preference or a particular order, and are not meant to limit the embodiments described herein. In the example embodiments described herein, numerous specific details are set forth in order to provide a more thorough understanding of the disclosure. However, it will be apparent to one of ordinary skill in the art having regard to the present application that the embodiments may be practiced without these specific details. In other instances, well-known features have not been described in detail to avoid unnecessarily complicating the description.

As used herein, the terms "a," "an," and "the" are intended to include plural alternatives, e.g., at least one. The phrase "and/or" means either or both. The terms "including", "with", and "having", as used herein, are defined as comprising (i.e., open language), unless specified otherwise.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Although embodiments described herein are made with reference to example embodiments, it should be appreciated by those skilled in the art having regard to the present application that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:
   a communication device;
   machine-readable instructions; and
   at least one processor circuit in communication with the communication device, the at least one processor circuit to be programmed by the machine-readable instructions to at least:
      determine a first pre-assembly kit pick job to pre-assemble a kit based on (a) a number of orders for the kit during a first time period and (b) a comparison between a kit pre-assembly time and a kit on-demand assembly time, the kit including a first item and a second item;
      control a first autonomous vehicle based on a first instruction to the first autonomous vehicle for performing the first pre-assembly kit pick job and a second pre-assembly kit pick job for the kit, the first pre-assembly kit pick job including collecting the first item and the second item, the first instruction including location information for use by the first autonomous vehicle in navigating to the first item and the second item in an environment;
      detect, via signals received from the first autonomous vehicle via the communication device and a network, that the first pre-assembly kit pick job has been completed, the detection based on one of (a) the signals received from the first autonomous vehicle indicating that the first pre-assembly kit pick job has been completed or (b) the signals received from the first autonomous vehicle indicating that the first autonomous vehicle is performing the second pre-assembly kit pick job;
      responsive to completion of the first pre-assembly kit pick job and prior to performance of a third pre-assembly kit pick job by the first autonomous vehicle, determine that the third pre-assembly kit pick job should not be performed based on a number of orders for the kit during a second time period, the second time period after the first time period; and
      responsive to the determination, control the first autonomous vehicle based on a second instruction to the first autonomous vehicle for performing a pick job not associated with the kit instead of the third pre-assembly kit pick job.

2. The system of claim 1, wherein the first instruction is to cause the first autonomous vehicle to travel to a first inventory location to collect a plurality of the first item and to travel to a second inventory location to collect a plurality of the second item.

3. The system of claim 2, wherein one or more of the at least one processor circuit is to control the first autonomous vehicle based on a third instruction for the first autonomous vehicle to travel to one of a kit assembly station or a pack-out station after the first autonomous vehicle collects the plurality of the first item and the plurality of the second item.

4. The system of claim 1, wherein one or more of the at least one processor circuit is to determine that the third pre-assembly kit pick job should not be performed based on the number of orders for the kit during the second time period reflecting a decrease in demand for the kit.

5. The system of claim 1, wherein one or more of the at least one processor circuit is to receive the number of orders for the kit during the first time period from one of an e-commerce computing system or a fulfillment management system.

6. The system of claim 5, wherein one or more of the at least one processor circuit is to determine the kit pre-assembly time and the kit on-demand assembly time based on historical data received from the fulfillment management system.

7. The system of claim 1, wherein one or more of the at least one processor circuit further determines the first pre-assembly kit pick job based on historical order data for the kit.

8. The system of claim 1, wherein one or more of the at least one processor circuit is to calculate the kit pre-assembly time based on historical data for collecting the first item, historical data for collecting the second item, and historical data for pre-assembling the kit.

9. The system of claim 1, wherein one or more of the at least one processor circuit is to calculate the kit on-demand assembly time based on historical data for collecting the first item, historical data for collecting the second item, and historical data for assembling the kit on demand.

10. A method comprising:

determining, by at least one processor circuit programmed by at least one instruction, a first pre-assembly kit pick job to pre-assemble a kit based on (a) a number of orders for the kit during a first time period and (b) a comparison between a kit pre-assembly time and a kit on-demand assembly time, the kit including a first item and a second item;

controlling, by one or more of the at least one processor circuit, a first autonomous vehicle based on a first instruction to the first autonomous vehicle for performing the first pre-assembly kit pick job and a second pre-assembly kit pick job for the kit, the first pre-assembly kit pick job including collecting the first item and the second item, the first instruction including location information for use by the first autonomous vehicle in navigating to the first item in an environment;

detecting, by one or more of the at least one processor circuit and via signals received from the first autonomous vehicle via a communication device and a network, that the first pre-assembly kit pick job has been completed, the detecting based on one of (a) the signals received from the first autonomous vehicle indicating that the first pre-assembly kit pick job has been completed or (b) the signals received from the first autonomous vehicle indicating that the first autonomous vehicle is performing the second pre-assembly kit pick job;

responsive to completion of the first pre-assembly kit pick job and prior to performance of a third pre-assembly kit pick job by the first autonomous vehicle, determining, by one or more of the at least one processor circuit, that the third pre-assembly kit pick job should not be performed based on a number of orders for the kit during a second time period, the second time period after the first time period; and responsive to the determining, controlling, by one or more of the at least one processor circuit, the first autonomous vehicle based on a second instruction to the first autonomous vehicle for performing a pick job not associated with the kit instead of the third pre-assembly kit pick job.

11. The method of claim 10, wherein the first instruction is to cause the first autonomous vehicle to travel to a first inventory location to collect a plurality of the first item and to a second inventory location to collect a plurality of the second item.

12. The method of claim 11, further including controlling, by one or more of the at least one processor circuit, the first autonomous vehicle based on a third instruction for the first autonomous vehicle to travel to one of a kit assembly station or a pack-out station after the first autonomous vehicle collects the plurality of the first item and the plurality of the second item.

13. The method of claim 10, further including determining, by one or more of the at least one processor circuit, that the third pre-assembly kit pick job should not be performed based on the number of orders for the kit during the second time period reflecting a decrease in demand for the kit.

14. The method of claim 10, further including accessing, by one or more of the at least one processor circuit, the number of orders for the kit during the first time period from one of an e-commerce computing system or a fulfillment management system.

15. The method of claim 14, further including determining, by one or more of the at least one processor circuit, the kit pre-assembly time and the kit on-demand assembly time based on historical data received from the fulfillment management system.

16. The method of claim 10, further including calculating, by one or more of the at least one processor circuit, the kit pre-assembly time based on historical data for collecting the first item, historical data for collecting the second item, and historical data for pre-assembling the kit.

17. The method of claim 10, further including calculating, by one or more of the at least one processor circuit, the kit on-demand assembly time based on historical data for collecting the first item, historical data for collecting the second item, and historical data for assembling the kit on demand.

18. A non-transitory computer-readable medium comprising machine-readable instructions to cause at least one processor circuit to at least:

determine a first pre-assembly kit pick job to pre-assemble a kit based on (a) a number of orders for the kit during a first time period and (b) a comparison between a kit pre-assembly time and a kit on-demand assembly time, the kit including a first item and a second item;

control a first autonomous vehicle based on a first instruction to the first autonomous vehicle for performing the first pre-assembly kit pick job and a second pre-assembly kit pick job for the kit, the first pre-assembly kit pick job including collecting the first item and the second item, the first instruction including location information for use by the first autonomous vehicle in navigating to the first item in an environment;

detect, via signals received from the first autonomous vehicle, that the first pre-assembly kit pick job has been completed, the detection based on one of (a) the signals received from the first autonomous vehicle indicating that the first pre-assembly kit pick job has been completed or (b) the signals received from the first autonomous vehicle indicating that the first autonomous vehicle is performing the second pre-assembly kit pick job;

responsive to completion of the first pre-assembly kit pick job and prior to performance of a third pre-assembly kit pick job by the first autonomous vehicle, determine that the third pre-assembly kit pick job should not be performed based on a number of orders for the kit during a second time period, the second time period after the first time period; and responsive to the determining, control the first autonomous vehicle based on a second instruction to the first autonomous vehicle for performing a pick job not associated with the kit instead of the third pre-assembly kit pick job.

19. The system of claim 1, wherein the kit is a first kit and the pick job not associated with the first kit is a pre-assembly pick job for a second kit, the second kit different than the first kit.

20. The non-transitory computer-readable medium of claim 18, wherein the instructions cause one or more of the at least one processor circuit to:

calculate the kit pre-assembly time based on historical data for collecting the first item, historical data for collecting the second item, and historical data for pre-assembling the kit; and calculate the kit on-demand assembly time based on historical data for collecting the first item, historical data for collecting the second item, and historical data for assembling the kit on demand.

* * * * *

UNITED STATES PATENT AND TRADEMARK OFFICE
CERTIFICATE OF CORRECTION

PATENT NO. : 12,093,866 B2
APPLICATION NO. : 17/378439
DATED : September 17, 2024
INVENTOR(S) : Kreis et al.

It is certified that error appears in the above-identified patent and that said Letters Patent is hereby corrected as shown below:

On the Title Page

Item (72), Under Inventors, Delete "Jeff Kreis, Wolleboro, NH (US);" and insert -- Jeff Kreis, Wolfeboro, NH (US) --

Signed and Sealed this
Fifteenth Day of October, 2024

Katherine Kelly Vidal
*Director of the United States Patent and Trademark Office*